United States Patent [19]

Mostafa Taha

[11] Patent Number: 4,854,357
[45] Date of Patent: Aug. 8, 1989

[54] WHEEL ACCESSORY FOR ADDITIONAL TRACTION

[76] Inventor: Maher A. H. Mostafa Taha, 3833 College Ave., Culver City, Calif. 90230

[21] Appl. No.: 24,975

[22] Filed: Mar. 12, 1987

[51] Int. Cl.⁴ ............................................. B60C 27/20
[52] U.S. Cl. .................................... 152/181; 152/173; 152/225 R; 301/41 R
[58] Field of Search ...................... 152/208, 185.1, 186, 152/187, 213 R, 218, 225 R, 225 C, 226–228, 213 A, 218, 216, 239, 167, 170, 173, 178, 181; 301/41 R, 43

[56] References Cited

U.S. PATENT DOCUMENTS

| | | | |
|---|---|---|---|
| 1,466,995 | 9/1923 | Denault | 152/185.1 |
| 1,599,001 | 9/1926 | Anderson et al. | 152/208 |
| 3,675,701 | 7/1972 | Garrison | 152/225 R |
| 3,871,720 | 3/1975 | Mosshart et al. | 152/185.1 |
| 4,323,102 | 4/1982 | Hall | 152/185.1 X |
| 4,408,646 | 10/1983 | Forsyth | 152/185.1 X |

Primary Examiner—Michael W. Ball
Assistant Examiner—Gregory J. Wilber
Attorney, Agent, or Firm—Marvin H. Kleinberg; Matthew F. Jodziewicz

[57] ABSTRACT

An apparatus for use with an automotive wheel including a tire to provide additional traction includes a first and a second ring member fabricated of hard grooved metal material, each having a sufficient diameter and held in a spaced-apart parallel relation by a plurality of transversely oriented angled bar members rigidly connected at each end and equally spaced along the circumference of the rings to the rings so as to be adapted to receive therein and therebetween the tire. The angled bar members each have a convex portion member oriented towards the tire and a concave portion oriented away from the tire. At least one selectively adjustable strap is provided for connecting both of the ring members to the tire in a rotataionally fixed, but removable relation. The selectively adjustable strap has sufficient length to engage both the ring members and the tire in a compressive relation.

11 Claims, 2 Drawing Sheets

4,854,357

WHEEL ACCESSORY FOR ADDITIONAL TRACTION

BACKGROUND OF THE INVENTION

1. Field of the Invention

This invention relates in general to accessories to increase vehicle tire traction, and, more particularly, to an apparatus for use with an automotive wheel including a tire to provide additional traction capability for the tire in loose terrain or on icy surfaces.

2. Description of the Related Art

A vehicle's tires are designed as a compromise to both city driving on hard paved surfaces at high speeds and to country driving on rough, uneven surface roads at slower speeds. As in most compromises, the design provides the performance desired for the mid-range of the expected conditions but fails to provide for the type of performance needed at the extremes of the driving range.

One such extreme of the driving range occurs when the tire must provide traction on icy or snow packed surfaces where the very hardness and smoothness of the ice gives the tire little to no chance to find traction points.

Another such extreme of the driving range is when the tire must provide traction in loose terrain such as sand, mud or gravel surfaces that are commonly found in off-road situations.

The existing prior art has attempted to better the performance of the compromise design currently used with tires by providing aftermarket add-on accessories for use with tires that enable a tire to produce more traction at the driving extremes of icy roads and off-road travel.

One such example of an aftermarket add-on accessory currently in wide use is snow chains. Snow chains, in a most common embodiment, are flexible chains that are linked together to form a ladder-like assembly that is wrapped around the circumference of a tire and connected to form a continuous ring. As the tire turns, the transverse "steps" of the ladder-like snow chains dig into the driving surface and provide additional traction.

Snow chains, however, are difficult to install and are apt to break or release during high speeds, damaging the vehicle and possibly injuring the driver. Also snow chains tend to damage both the tire and the road if they are driven on dry, hard road surfaces.

Thus, the user of the snow chains is forced to install the snow chains, usually at the side of the road when the roadway driving conditions become sufficiently dangerous to require additional traction, and, to remove the snow chains when the road conditions improve, hopefully before damage to the tires or road can occur.

Such installation and removal is usually accomplished in less than ideal conditions and is sometimes dangerous to the individual concerned. Snow chains have somewhat limited use in off-road situations and are generally restricted to snow and ice driving.

The problem with existing prior art aftermarket accessories then, such as snow chains, is that the accessories are usually limited to use in only one of the two extremes noted above, that is, they are useful in either icy conditions or in loose gravel conditions, but not both. Also such devices are difficult to install and are apt to release or break during use, causing damage to the vehicle and possibly injuring the driver. The very flexibility needed to fit these devices to a wheel is quite often the cause of its breaking.

The present invention provides an aftermarket apparatus that solves the problems of the prior art devices as described below.

SUMMARY OF THE INVENTION

It is an object of the present invention to provide an apparatus for use with an automotive wheel including a tire to provide additional traction in either icy conditions or in loose gravel conditions where traction is normally lessened for an unaided tire.

It is another object of the present invention to provide an apparatus for use with an automotive wheel including a tire to provide additional traction that is easy to install and remove from the tire by an individual.

It is still another object of the present invention to provide an apparatus for use with an automotive wheel including a tire that is easy to maintain and economical to manufacture.

In general, the present invention is embodied in an apparatus for use with an automotive wheel including a tire to provide additional traction including a first and a second ring member, each having a sufficient diameter to surround the tire and held in a spaced-apart parallel relation by a plurality of transversely oriented bar members rigidly connected at each end along the circumference of the rings to the rings so as to be adapted to receive therein and therebetween the wheel and tire, whereby additional inflation of the tire secures the rings in place.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

Figure 1:
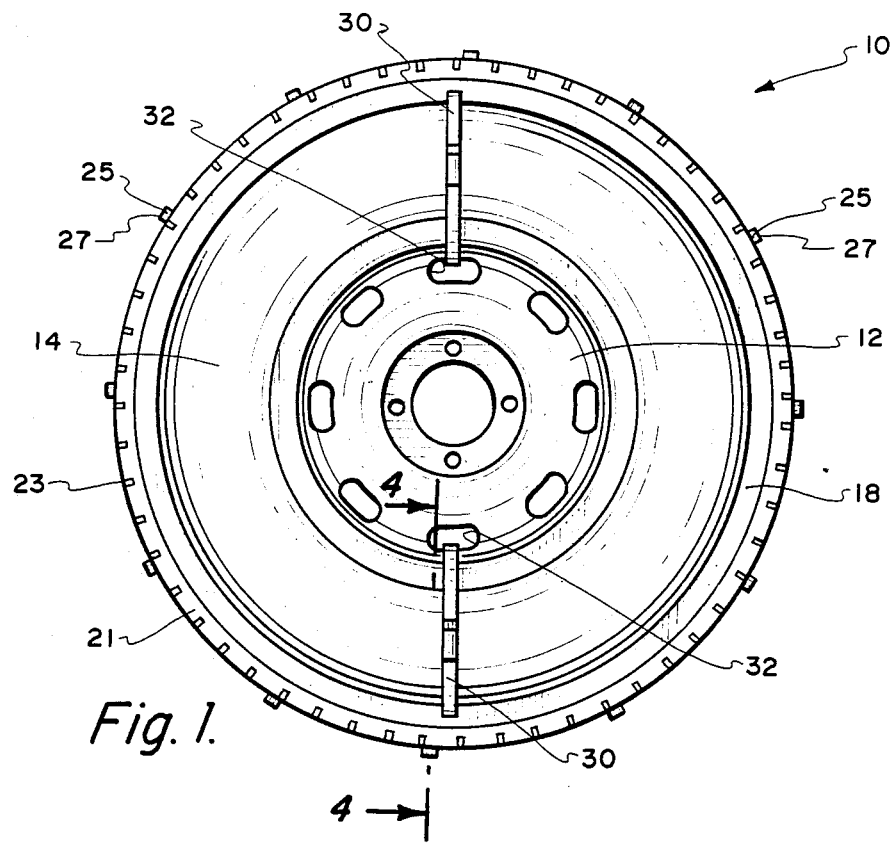
FIG. 1 is a side perspective view of an apparatus embodying the present invention being used in conjunction with an automotive wheel including a tire.
Figure 2:
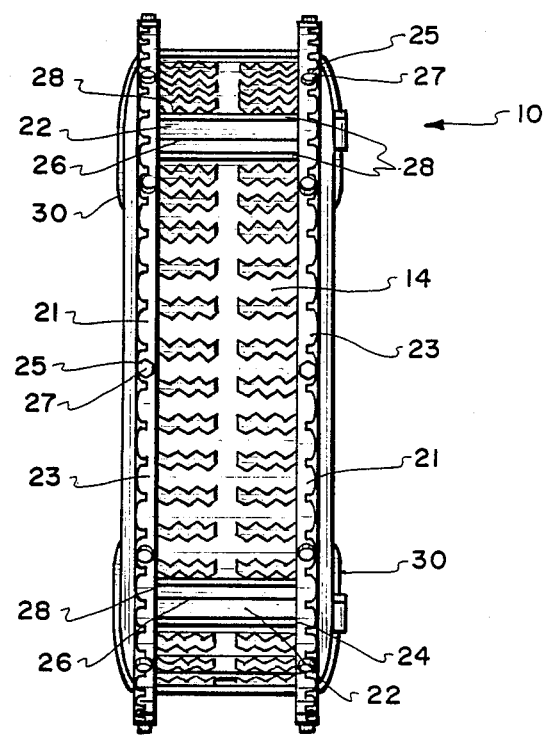
FIG. 2 is a front perspective view of an apparatus embodying the present invention being used in conjunction with an automotive wheel including a tire.
Figure 3:
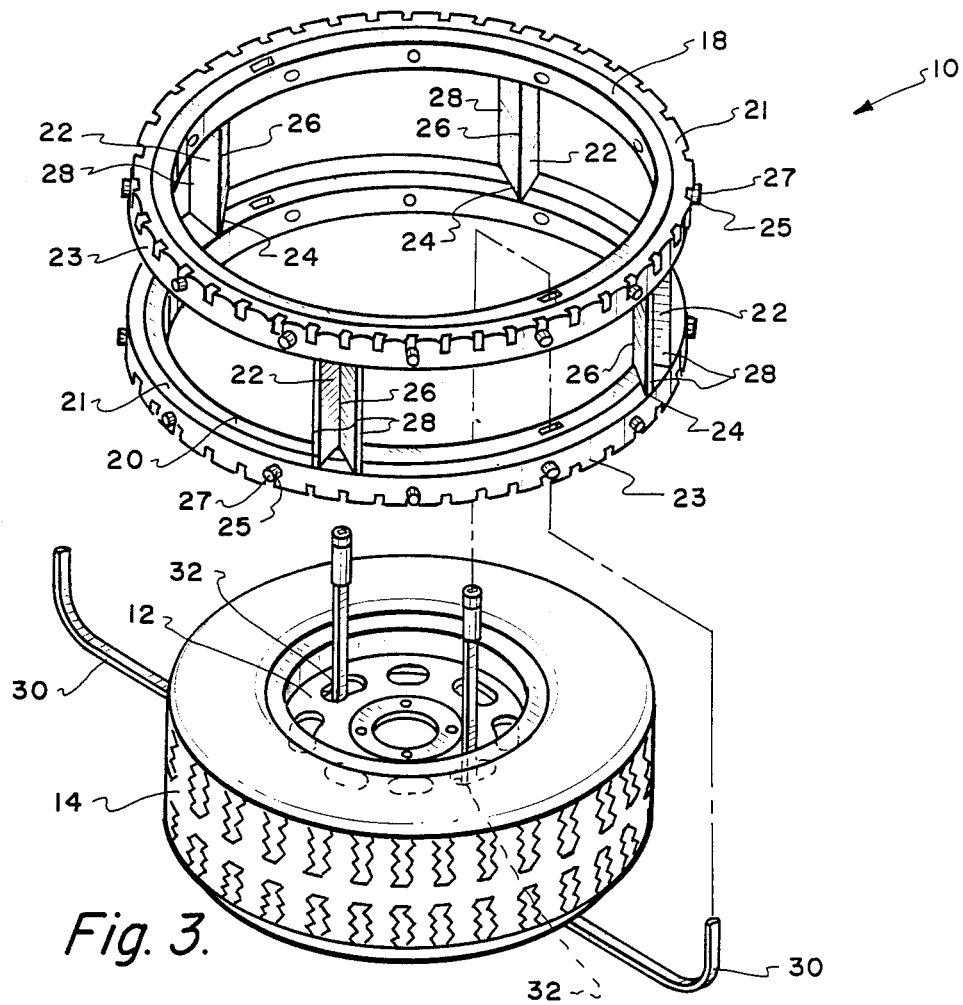
FIG. 3 is an exploded view of an apparatus constructed in accordance with the present invention.

An apparatus for use with an automotive wheel including a tire to provide additional traction that is constructed in accordance with and embodies the present invention, is generally referred to by the reference numeral 10 in FIGS. 1 through 4.

Apparatus 10 is shown in the FIGs. as being used with an automotive wheel 12 having mounted thereon a tire 14. Tire 14 has a treaded circumferential portion 16 that normally engages the driving surface. While it is assumed that the present invention will be used with treaded tires, there is no reason why the apparatus 10 cannot also be used with tires having no tread in appropriate circumstances calling for such smooth tires.

A first and a second ring member 18, 20, are major components of apparatus 10. Ring members 18 and 20 are preferably fabricated of hard grooved metal material so as to minimize wear on the ring members during use of apparatus 10 due to the forces exerted by the wheel 12 and tire 14 against the roadway.

To further minimize wear and tear on both apparatus 10 and tire 14, as well as on the driving surface, a layer 21 of soft pliable material covers the outer periphery 23 of each of the rings 18, 20 so as to act as a cushion between rings 18, 20 and the driving surface on which additional traction is to be provided by apparatus 10. Preferable materials for layer 21 are a rubber material or a synthetic plastic material. Layer 21 not only protects rings 18, 20 but also acts to reduce noise caused by hard metal engaging a driving surface.

Figure 4:
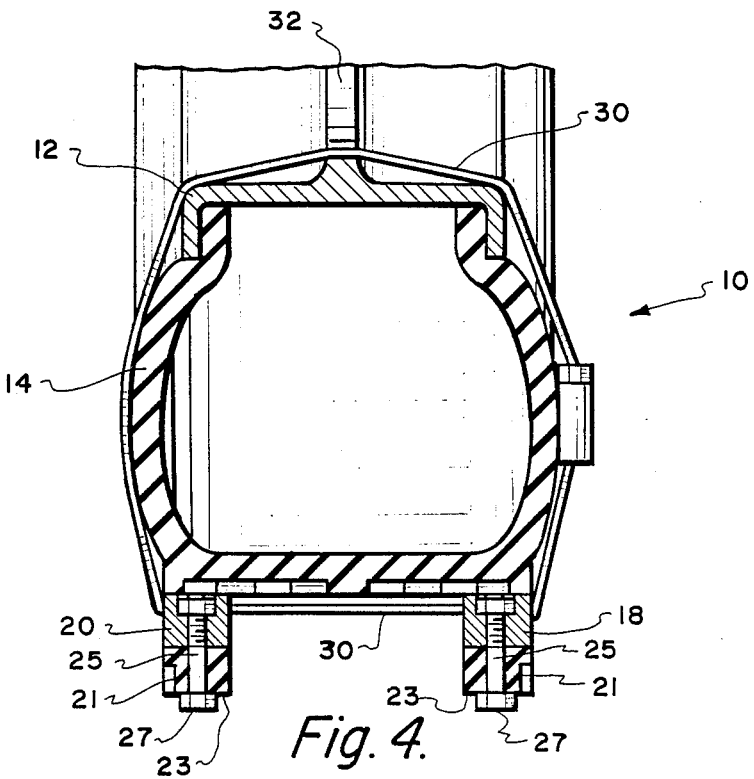
FIG. 4 is a cross sectional view taken along the line 4-4 of FIG. 1.

Layer 21 may be bolted to rings 18, 20 by means of bolts 25, as shown in FIG. 4, passing through both layer 21 and rings 18, 20. Bolt heads 27 preferably protrude above the surface of layer 21 so as to add additional traction to apparatus 10 similar to a studded tire.

Each ring member 18 and 20 has a sufficient diameter to encircle the tire 14. Likewise, ring members 18 and 20 are held in a spaced-apart parallel relation by a plurality of transversely oriented angled bar members 22 rigidly connected at each end 24 to ring members 18 and 20 along the circumference of the ring members 18 and 20. Bar members 22 are preferably equally spaced around the rings 18 and 20 to provide a uniform set of points of additional traction force for the tire meeting the driving surface.

Ring members 18 and 20 are held in the spaced-apart relation so as to be adapted to receive therein and therebetween the wheel 12 and tire 14 as shown in the FIGs.

Angled bar members 22 each have a convex portion 26 oriented towards the tire 14 and a concave portion 28 oriented away from the tire 14.

Tire 14 can be held in a rotationally fixed relation to apparatus 10 by a number of methods. The first method would be to additionally inflate tire 14 once it is inserted between ring members 18, 20 so as to secure the tire 14 into a tight compressive relation with ring members 18, 20 as well as with angled bar members 22.

A second method to hold tire 14 in a rotationally fixed, yet selectively removable relation to apparatus 10, is by the addition of at least one, although preferably two, selectively adjustable straps 30 that have sufficient length to encircle both the ring members 18 and 20 and the tire 14. As shown in the FIGs., straps 30 may be inserted through an aperture 32 in wheel 12 and adjacent in length to hold wheel 12 in a tight compressive relation.

A combination of both of these methods of holding tire 14 rotationally fixed with respect to the apparatus 20 can also be employed to provide a doubly secure connection.

As shown in the FIGs., the spacing between rings 18 and 20 in the spaced-apart parallel relation described above is sufficient to allow the treaded portion 16 of the tire 14 to protrude therebetween and make direct contact with the driving surface.

Angled bar members 22 also make direct contact with the driving surface and provide additional traction points for tire 14. Specifically, the concave portion 28 "scoops" the driving surface and "digs" into the ice or loose gravel to provide a strong point of traction for the tire 14.

Similarly, convex portion 26 of the bar members 22 engages the tire 14 causing a slight deformity of the tire 14 which adds to the traction afforded the tire.

Installation of apparatus 10 is accomplished by first raising the wheel 12 and tire 14 off the ground by a jack or the like means. Apparatus 10 is then positioned so that tire 14 is inserted between the ring members 18 and 20 as they are held in the spaced-apart relation. The inflation pressure of tire 14 may be lessened to insure a tight fit between the tire 14 and the apparatus 10, that is, with lessened pressure the tire 14 may be inserted in the apparatus 10 and later inflated to a higher pressure to strengthen the rotationally fixed relation between the tire 14 and the apparatus 10.

If adjustable straps 30 are used with the apparatus 10, they are positioned to encircle the tire 14 and to pass through apertures 32 in wheel 12. Once straps 30 are in position, they are fastened to compressively hold both the tire 14 and the apparatus 10 in the desired rotationally fixed relation. The wheel 12 is then lowered to the ground and the driver is ready to resume his travel.

Removal of the apparatus 10 is the reverse of the above steps for the installation of the apparatus 10 on tire 14. Straps 30 are loosened and withdrawn from apertures 32 in wheel 14. Tire 14 may be slightly deflated, if necessary, to provide sufficient leeway to remove it from its position between ring members 18 and 20. Once apparatus 10 is removed from tire 14, tire 14 may be re-inflated, if necessary, to the suggested inflation pressure for the roadway and vehicle conditions.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. An apparatus for use with an automotive wheel including a tire to provide additional traction on a surface comprising:

a first and a second ring member fabricated of hard grooved metal material, each having a sufficient diameter and held in a spaced-apart parallel relation by a plurality of transversely oriented angled bar members rigidly connected at each end and equally spaced along the circumference of said rings to said rings so as to be adapted to receive therein and therebetween the tire, said angled bar members having a convex portion member oriented towards the tire and a concave portion oriented away from the tire; and at least one selectively adjustable strap for connecting both of said ring members to the wheel in a rotationally fixed, but removable relation, said selectively adjustable strap having sufficient length to engage both said ring members and the wheel in a compressive relation.

2. An apparatus for use with an automotive wheel including a tire to provide additional traction as recited in claim 14 wherein the distance between said first and second ring members in said spaced-apart parallel relation is sufficient to allow the treaded portion of the wheel to protrude therebetween.

3. An apparatus for use with an automotive wheel including a tire to provide additional traction as recited in claim 14 wherein a layer of a soft, pliable material covers the outer periphery of each of said rings so as to act as a cushion between said rings and the surface on which additional traction is provided.

4. An apparatus for use with an automotive wheel including a tire to provide additional traction as recited in claim 16 wherein said soft, pliable material comprises a rubber material.

5. An apparatus for use with an automotive wheel including a tire to provide additional traction as recited in claim 16 wherein said soft, pliable material comprises a synthetic plastic material.

6. An apparatus for use with an automotive wheel including a tire to provide additional traction as recited in claim 16 wherein said layer is fastened to said rings by a plurality of bolts.

7. An apparatus for use with an automotive wheel including a tire to provide additional traction as recited in claim 19 wherein the heads of said bolts protrude outwardly from said layer for engaging the surface on which additional traction is provided.

8. An apparatus for use with an automotive wheel including a tire to provide additional traction on a surface comprising:
- a first and a second ring member fabricated of hard grooved metal material, each having a sufficient diameter and held in a spaced-apart parallel relation by a plurality of transversely oriented angled bar members rigidly connected at each end and equally spaced along the circumference of said rings to said rings so as to be adapted to receive therein and therebetween the tire, and having the distance between said first and second ring members in said spaced-apart parallel relation sufficient to allow the treaded portion of the tire to protrude therebetween, said angled bar members having a convex portion member oriented towards the tire and a concave portion oriented away from the tire;
- a layer of a soft, pliable material covering the outer periphery of each of said rings so as to act as a cushion between said rings and the surface on which additional traction is provided, each of said layers being fastened to said rings by a plurality of bolts, the heads of said bolts protruding outwardly from said layer for engaging the surface on which additional traction is provided; and
- at least one selectively adjustable strap for connecting both of said ring members to the wheel in a rotationally fixed, but removable relation, said selectively adjustable strap having sufficient length to engage both said ring members and the wheel in a compressive relation.

9. An apparatus for use with an automotive wheel including a tire to provide additional traction as recited in claim 8 wherein said soft, pliable material comprises a rubber material.

10. An apparatus for use with an automotive wheel including a tire to provide additional traction as recited in claim 8 wherein said soft, pliable material comprises a synthetic plastic material.

11. An apparatus for use with an automotive wheel including a tire to provide additional traction on a surface comprising:
- a first and a second ring member, each having a sufficient diameter to surround the tire and held in a spaced-apart parallel relation by a plurality of transversely oriented bar members rigidly connected at each end along the circumference of said rings to said rings so as to be adapted to receive therein and therebetween the wheel and tire, whereby additional inflation of the tire secures said rings in place;
- a layer of soft, pliable materials covers the outer periphery of each of said rings so as to act as a cushion between said rings and the surface on which additional traction is provided, said layer fastened to said rings by a plurality of bolts, the heads of said bolts protruding outwardly from said layer for engaging the surface on which additional traction is provided.

* * * * *